(12) United States Patent
Takahashi et al.

(10) Patent No.: US 12,005,848 B2
(45) Date of Patent: Jun. 11, 2024

(54) OCCUPANT PROTECTION DEVICE

(71) Applicant: TOYODA GOSEI CO., LTD., Kiyosu (JP)

(72) Inventors: Hitomi Takahashi, Kiyosu (JP); Wataru Miura, Kiyosu (JP); Yasushi Masuda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/334,562

(22) Filed: Jun. 14, 2023

(65) Prior Publication Data
US 2024/0001879 A1  Jan. 4, 2024

(30) Foreign Application Priority Data
Jul. 4, 2022  (JP) .................. 2022-107877

(51) Int. Cl.
*B60R 21/02*  (2006.01)
*B60N 2/427*  (2006.01)

(52) U.S. Cl.
CPC .......... *B60R 21/02* (2013.01); *B60N 2/42718* (2013.01); *B60R 2021/022* (2013.01)

(58) Field of Classification Search
CPC .............. B60N 2/4263; B60N 2/42763; B60N 2/42718; B60R 22/26; B60R 2021/0206; B60R 21/207; B60R 2021/022; B60R 21/02
See application file for complete search history.

(56) References Cited

U.S. PATENT DOCUMENTS

| | | | | |
|---|---|---|---|---|
| 2,736,566 | A * | 2/1956 | Hartl | B60N 2/4221 180/274 |
| 6,672,667 | B1* | 1/2004 | Park | B60N 2/42763 297/216.19 |
| 9,573,561 | B2* | 2/2017 | Muto | B60R 22/22 |
| 10,391,970 | B2* | 8/2019 | Barbat | B60N 2/14 |
| 10,682,578 | B1* | 6/2020 | Malatek | A61B 5/024 |
| 10,974,626 | B2* | 4/2021 | Yilma | B60N 2/42718 |
| 11,021,090 | B2* | 6/2021 | Humer | A47C 7/503 |

(Continued)

FOREIGN PATENT DOCUMENTS

| | | | | |
|---|---|---|---|---|
| EP | 2364888 | A1 * | 9/2011 | ............. B60N 2/688 |
| FR | 2820328 | A1 * | 8/2002 | ............. B60R 21/055 |

(Continued)

*Primary Examiner* — Amy R Weisberg
*Assistant Examiner* — Maxwell L Meshaka
(74) *Attorney, Agent, or Firm* — Posz Law Group, PLC

(57) ABSTRACT

An occupant protection device includes a seat having a seat portion and a backrest portion, a first restraining member configured to restrain a left shoulder of an occupant, a second restraining member configured to restrain a right shoulder of the occupant, a take-up unit that holds and takes up the first restraining member and the second restraining member, and a lifting unit, wherein the first restraining member and the second restraining member are fed out from a housing portion of the seat owing to being taken up by the take-up unit, and restrain the left and right shoulders, and wherein the lifting unit causes a front edge side of a seat face of the seat portion to rise when the take-up unit takes up the first restraining member and the second restraining member.

3 Claims, 10 Drawing Sheets

(56) References Cited

U.S. PATENT DOCUMENTS

| | | | | |
|---|---|---|---|---|
| 11,180,052 | B2* | 11/2021 | Quintao Severgnini | ....................... B60N 2/002 |
| 11,760,304 | B2* | 9/2023 | Hicke | ................ B60R 22/4604 280/801.1 |
| 2003/0230919 | A1* | 12/2003 | Park | ................... B60N 2/42754 297/344.1 |
| 2005/0240329 | A1* | 10/2005 | Hirota | ................. B60R 21/0134 701/41 |
| 2009/0322067 | A1* | 12/2009 | Nezaki | .................... B60R 22/26 297/474 |
| 2016/0257283 | A1* | 9/2016 | Muto | ..................... B60R 22/26 |
| 2018/0126947 | A1* | 5/2018 | Barbat | .................... B60R 22/20 |
| 2020/0108748 | A1* | 4/2020 | Sekizuka | ............ A47C 31/126 |
| 2020/0188802 | A1* | 6/2020 | Malatek | ................. A61B 5/702 |
| 2021/0078468 | A1* | 3/2021 | Yilma | .................... B60R 21/18 |
| 2021/0094454 | A1* | 4/2021 | Humer | ................... A47C 7/503 |
| 2021/0206295 | A1* | 7/2021 | Quintao Severgnini | ...................... B60N 2/002 |
| 2022/0153225 | A1* | 5/2022 | Hicke | ..................... B60R 22/02 |
| 2022/0324402 | A1* | 10/2022 | Einspahr | ................. B60R 22/26 |
| 2023/0415690 | A1* | 12/2023 | Takahashi | .............. B60R 21/02 |
| 2024/0001879 | A1* | 1/2024 | Takahashi | ............. B60R 21/207 |

FOREIGN PATENT DOCUMENTS

| | | | | |
|---|---|---|---|---|
| JP | H0577686 | A | * | 1/1993 |
| JP | 2006175901 | A | * | 7/2006 |
| JP | 2007-015541 | A | | 1/2007 |
| JP | 2010058722 | A | * | 3/2010 |
| JP | 2011005989 | A | * | 1/2011 |
| JP | 2014043127 | A | * | 3/2014 |
| JP | 2023183143 | A | * | 12/2023 |
| WO | WO-2006034828 | A1 | * | 4/2006 ........... B60N 2/4221 |

* cited by examiner

OCCUPANT PROTECTION DEVICE

The present application claims priority from Japanese Patent Application No. 2022-107877 of Takahashi et al., filed on Jul. 4, 2022, the disclosures of which are hereby incorporated into the present application by reference.

BACKGROUND

Technical Field

The present invention relates to an occupant protection device for protecting an occupant seated in a seat.

Description of Related Art

A configuration wherein an occupant is restrained in a seat by a restraining member is already known as an occupant protection device that protects an occupant seated in a seat. Also, a configuration wherein left and right shoulder portions of an occupant are restrained against a backrest portion by left and right restraining members being brought into contact with front face sides of the left and right shoulder portions respectively of the occupant is disclosed in JP No. 2007-15541A.

However, the configuration described in JP No. 2007-15541A is such that a configuration for restraining an occupant in a seat is limited to the left and right restraining members. In order to protect an occupant more safely, it is desirable that movement of the occupant in a direction away from the seat can be restricted more reliably not only by restraining a vicinity of either shoulder of the occupant with a restraining member, but also by using another configuration.

SUMMARY

An object of the invention is to provide an occupant protection device that can more reliably restrict a movement of an occupant in a direction away from a seat.

A representative configuration of an occupant protection device according to the invention is as follows.

An occupant protection device, includes:

a seat having a seat portion and a backrest portion;

a first restraining member configured to restrain a left shoulder of an occupant seated on the seat, an upper end portion of the first restraining member being fixed to a left upper end side of the backrest portion, an intermediate portion between the upper end portion and a lower end portion of the first restraining member being housed in a left side face of the backrest portion and a left side face of the seat portion;

a second restraining member configured to restrain a right shoulder of the occupant seated on the seat, an upper end portion of the second restraining member being fixed to a right upper end side of the backrest portion, an intermediate portion between the upper end portion and a lower end portion of the second restraining member being housed in a right side face of the backrest portion and a right side face of the seat portion;

a take-up unit that holds and takes up each of the lower end portion of the first restraining member and the lower end portion of the second restraining member, the take-up unit being disposed on a front edge side of the seat portion; and a lifting unit that causes a front edge side of a seat face of the seat portion to rise, wherein the first restraining member is fed out from a housing portion of the seat owing to being taken up by the take-up unit, and restrains the left shoulder of the occupant from the front of the left shoulder, and the second restraining member is fed out from a housing portion of the seat owing to being taken up by the take-up unit, and restrains the right shoulder of the occupant from the front of the right shoulder, and wherein the lifting unit causes the front edge side of the seat face of the seat portion to rise when the take-up unit takes up the first restraining member and the second restraining member.

DESCRIPTION OF THE PREFERRED EMBODIMENTS

Figure 1:
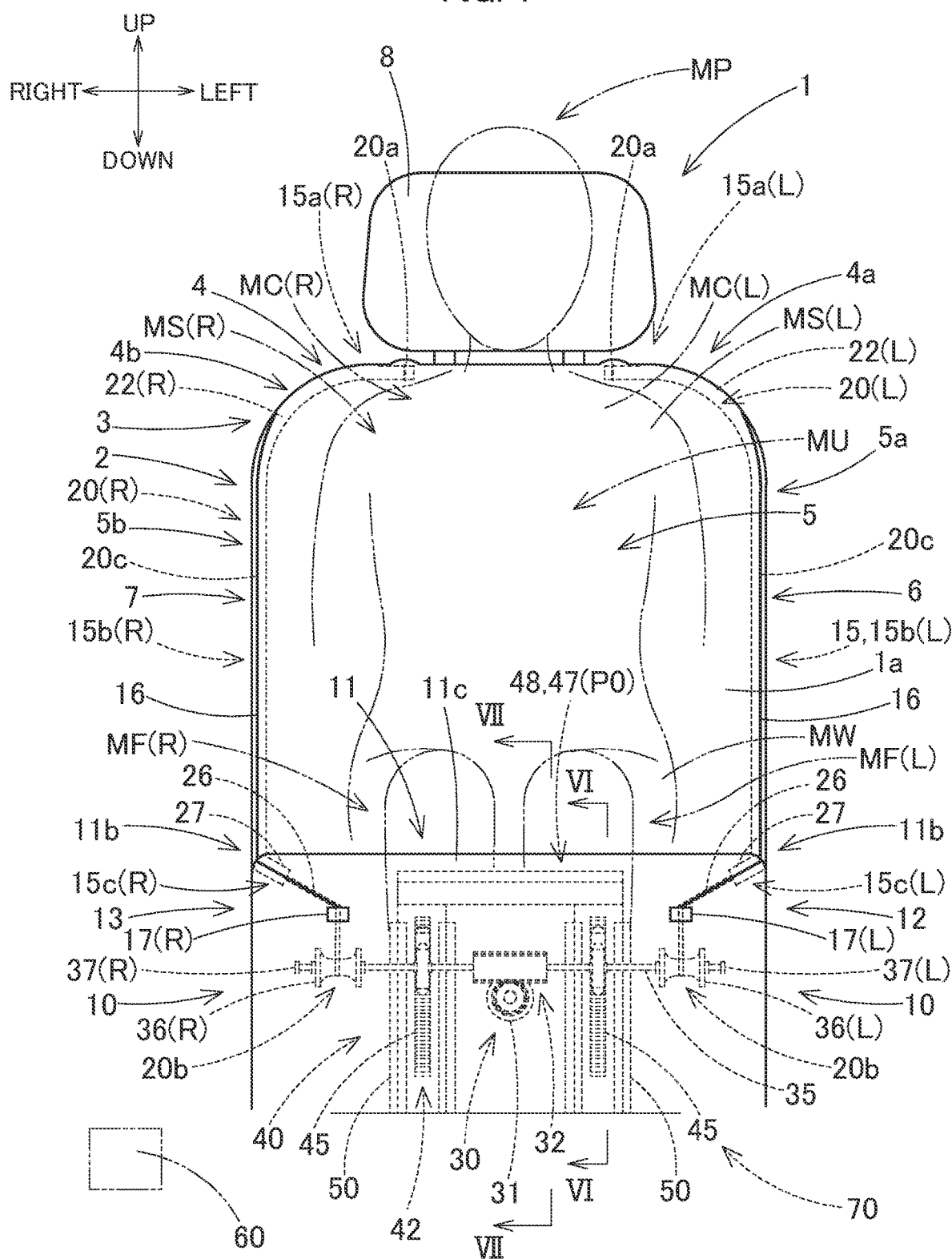
FIG. 1 is a schematic front view of an occupant protection device according to one embodiment of the invention.
Figure 2:
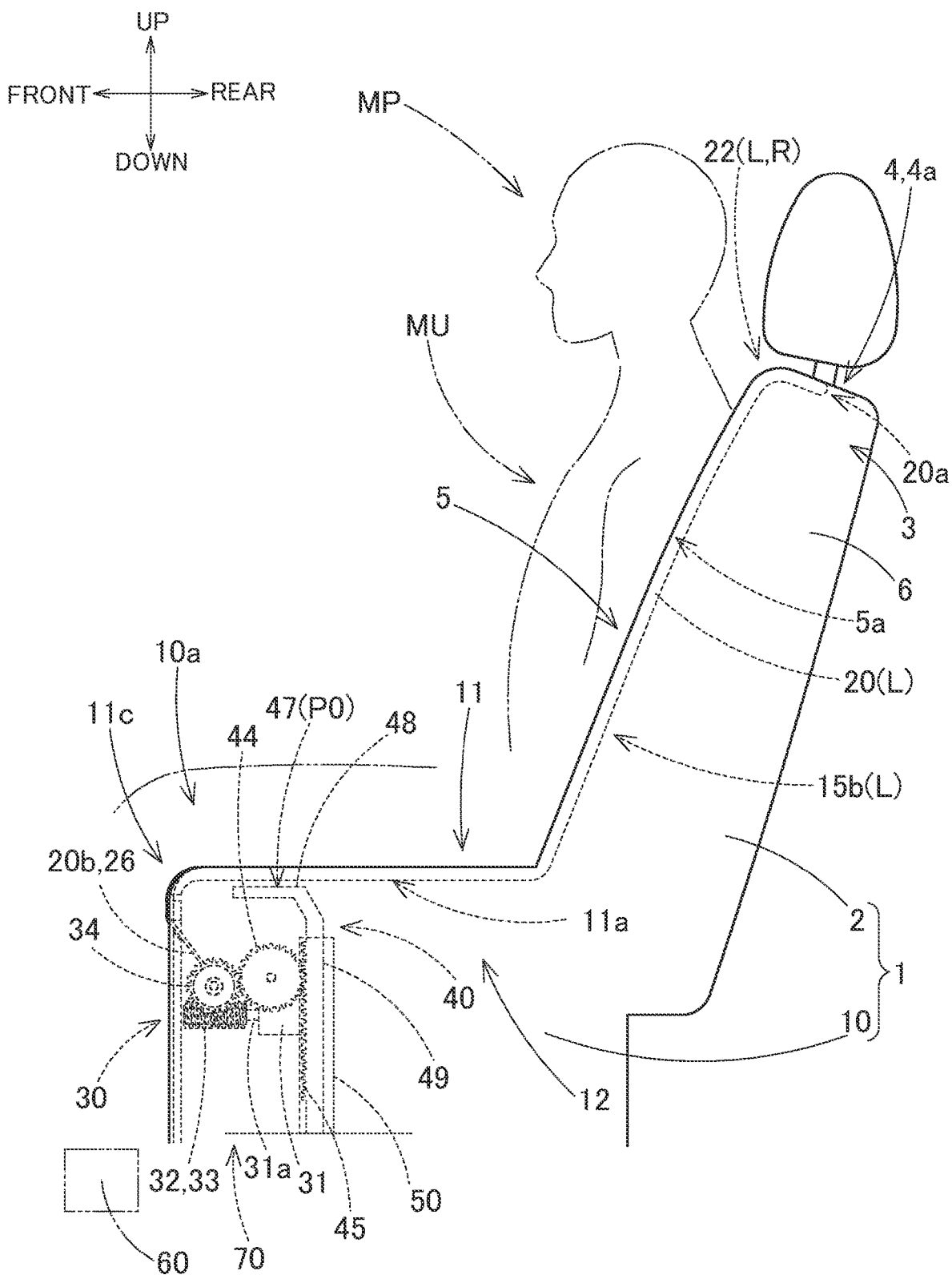
FIG. 2 is a schematic left side view of the occupant protection device.
Figure 3:
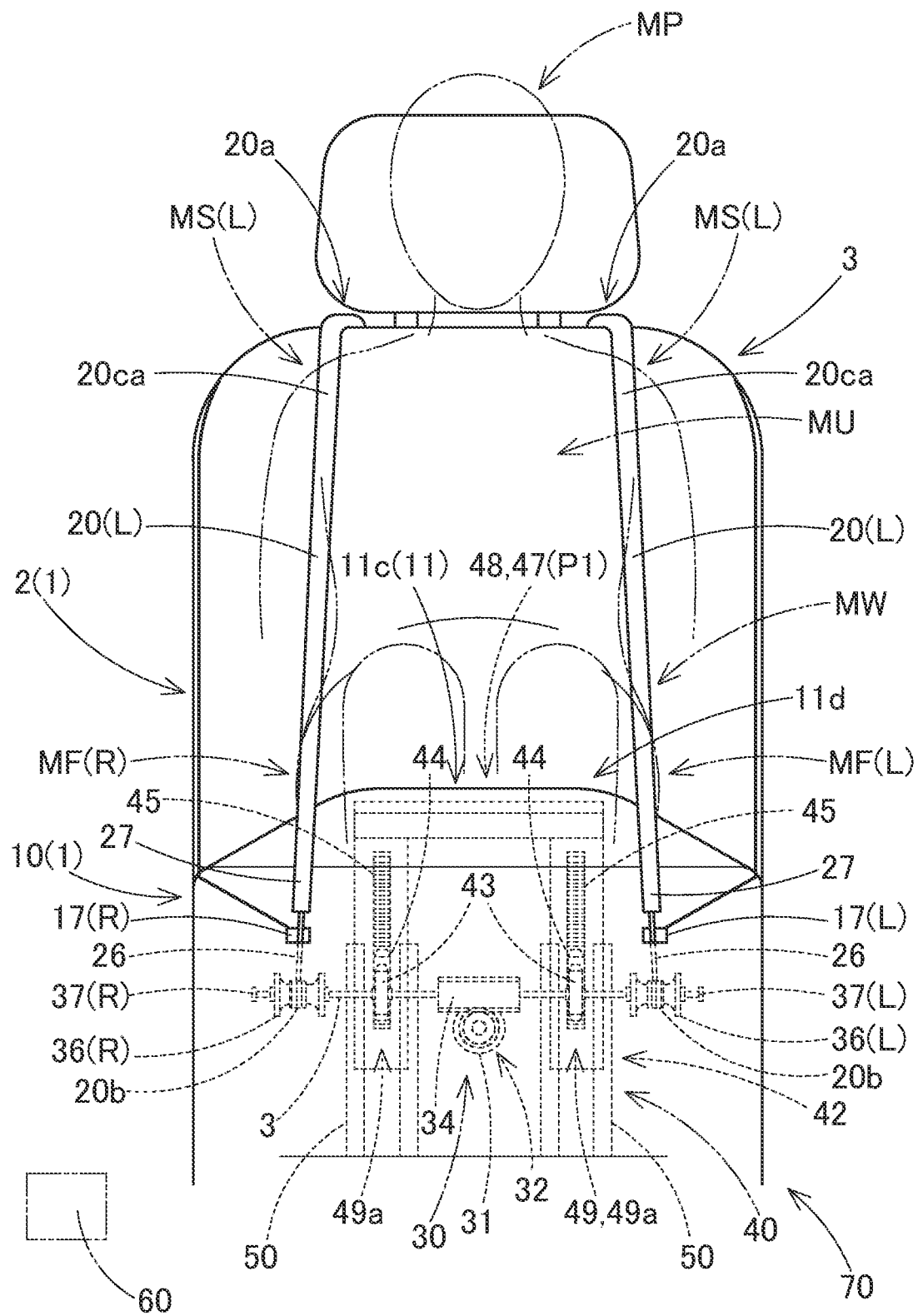
FIG. 3 is a schematic front view of the occupant protection device when operating.
Figure 4:
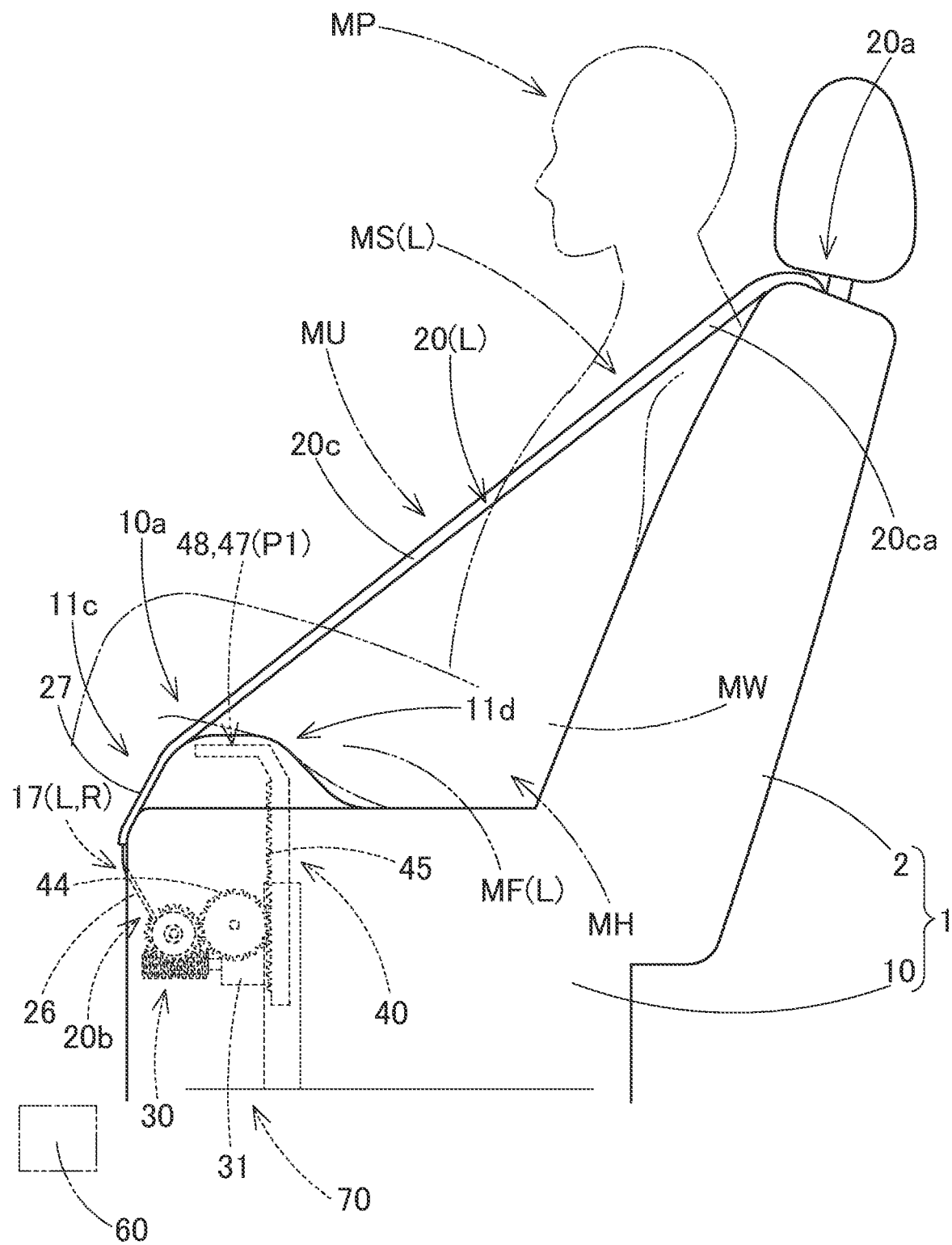
FIG. 4 is a schematic left side view of the occupant protection device when operating.

Preferred embodiments of the invention are described below with reference to accompanying drawings. However, the invention is not limited to the embodiments disclosed herein. All modifications within the appended claims and equivalents relative thereto are intended to be encompassed in the scope of the claims.

Hereafter, an occupant protection device 70 according to an embodiment of the invention will be described. As shown in FIGS. 1 to 4, the occupant protection device 70 is mounted in a seat 1 that includes a seat portion 10, on which an occupant MP of a vehicle sits, and a backrest portion 2. The occupant protection device 70 includes shoulder restraining members 20(L) and 20(R), a take-up device 30 (a take-up unit), and a lifting device 40 (a lifting unit).

A headrest portion 8 is disposed in the backrest portion 2 of the seat 1 in such a way as to extend upward from an upper end face 4 of an upper end portion 3. A front face 5 of the backrest portion 2 is a region that receives an upper body MU of the occupant MP. Also, a seat face 11, which is an upper face of the seat portion 10, is a region that receives the seated occupant MP from below.

An upper end portion 20a of the shoulder restraining members 20(L) and 20(R) is fixed to the upper end face 4 in a vicinity of a left-right direction center of the upper end portion 3 of the backrest portion 2. In other words, the upper end portion 20a of the shoulder restraining members 20(L) and 20(R) is fixed in a vicinity of a left and right of the headrest portion 8, which is a vicinity above left and right collarbones MC (L and R) of the seated occupant MP. The upper end portion 20a of the shoulder restraining members 20(L) and 20(R) is fixed as a fixed end to a bracket extending from an unshown frame of the backrest portion 2.

The left and right shoulder restraining members 20(L) and 20(R) are elongated members having flexibility, and are housed in the seat 1 in such a way as to enclose the seated occupant MP to the left and right. Specifically, the left side shoulder restraining member 20(L) (a first restraining member) is such that the upper end portion 20a thereof is fixed to a left upper end side of the backrest portion 2, and an intermediate portion 20c between the upper end portion 20a and a lower end portion 20b is housed in a housing portion 15 of a left edge 5a (a left side face) of the backrest portion 2 and the housing portion 15 of a left edge 11a (a left side face) of the seat portion 10. The right side shoulder restraining member 20(R) (a second restraining member) is such that the upper end portion 20a thereof is fixed to a right upper end side of the backrest portion 2, and the intermediate portion 20c between the upper end portion 20a and the lower end portion 20b is housed in the housing portion 15 of a right edge 5b (a right side face) of the backrest portion 2 and the housing portion 15 of a right edge 11b (a right side face) of the seat portion 10. Also, the lower end portion 20b of the shoulder restraining member 20(L) and the lower end portion 20b of the shoulder restraining member 20(R) are held in the take-up device 30, which is provided inside the seat portion 10. In other words, the shoulder restraining members 20(L) and 20(R) are housed in the housing portion 15 in such a way as to, when housed, extend respectively to left and right edge 4a and 4b sides of the upper end face 4 of the backrest portion 2 from the upper end portion 20a on an upper end portion 3 side of the backrest portion 2, extend downward on left and right edge 5a and 5b sides of the backrest portion 2, continue to left and right edge 11a and 11b sides of the seat portion 10, pass from the left and right edge 11a and 11b sides of the seat portion 10 through an aperture 17 (L and R) on a front edge 11c side of the seat portion 10, and be coupled with the take-up device 30 disposed inside the seat portion 10.

Figure 6:
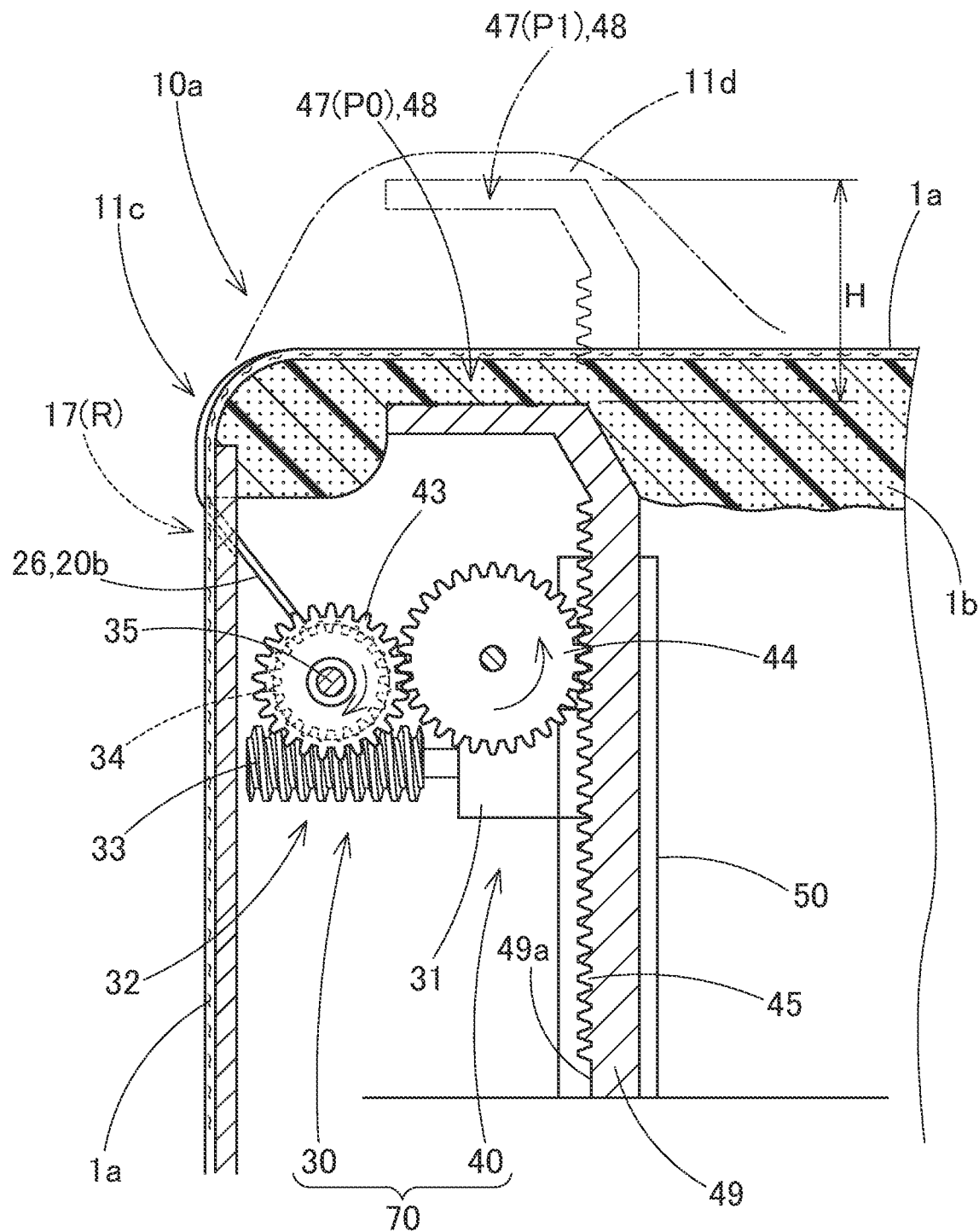
FIG. 6 is a schematic sectional view illustrating a lifting device of the occupant protection device, and shows a vicinity of a VI-VI region shown in FIG. 1.
Figure 7:
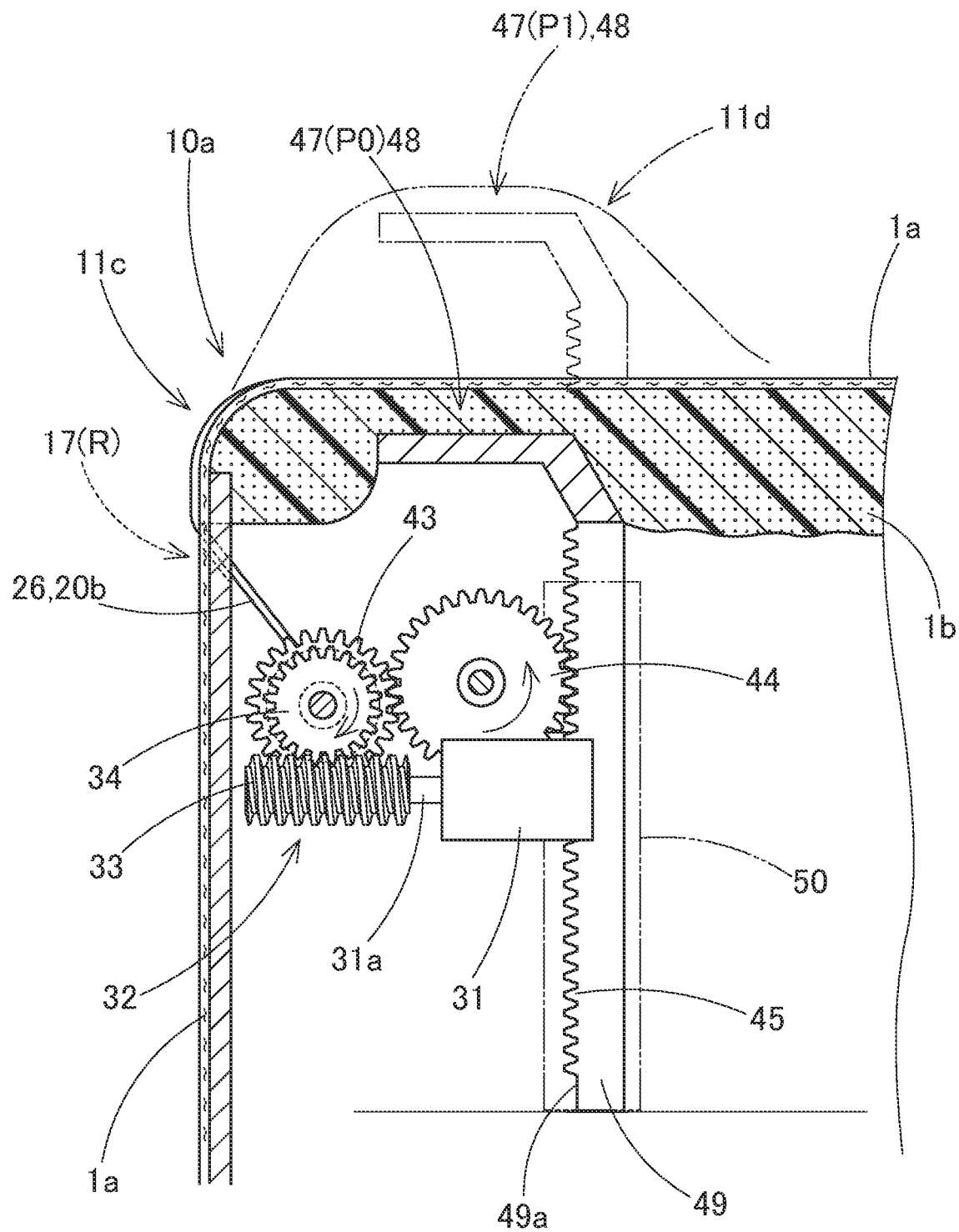
FIG. 7 is a schematic sectional view illustrating a drive mechanism of a take-up device and the lifting device of the occupant protection device, and shows a vicinity of a VII-VII region shown in FIG. 1.

The housing portion 15 is of a groove form, and is formed in the upper end face 4, the left edge 5a, and the right edge 5b of the backrest portion 2, the left edge 11a and the right edge 11b of the seat portion 10, and a front face 14 of the seat portion 10. In other words, the housing portion 15 includes an upper portion 15a (L and R) on an upper end face 4 side of the backrest portion 2, a side portion 15b (L and R) on left and right side face 6, 7, 12, and 13 sides of the backrest portion 2 and the seat portion 10 continuing from the upper portion 15a (L and R), and a front portion 15c (L and R) that is disposed on a front face 14 side of the seat portion 10 continuing from the side portion 15b (L and R), and extends to an aperture 17 (L and R) side. The housing portion 15 is formed by providing a slit 16 in a fabric 1a (refer to FIGS. 6 and 7) on a surface of the seat 1. The fabric 1a covers a cushion member 1b (refer to FIGS. 6 and 7), and the shoulder restraining members 20(L) and 20(R) are embedded in the cushion member 1b.

The intermediate portion 20c of the shoulder restraining members 20(L) and 20(R) housed in the housing portion 15 is such that a bent portion 22 (L and R) that bends downward approximately perpendicularly is formed in such a way as to extend on the left and right side face 6 and 7 sides of the backrest portion 2 on the left and right edge 4a and 4b sides of the upper end face 4 of the backrest portion 2.

Figure 5:
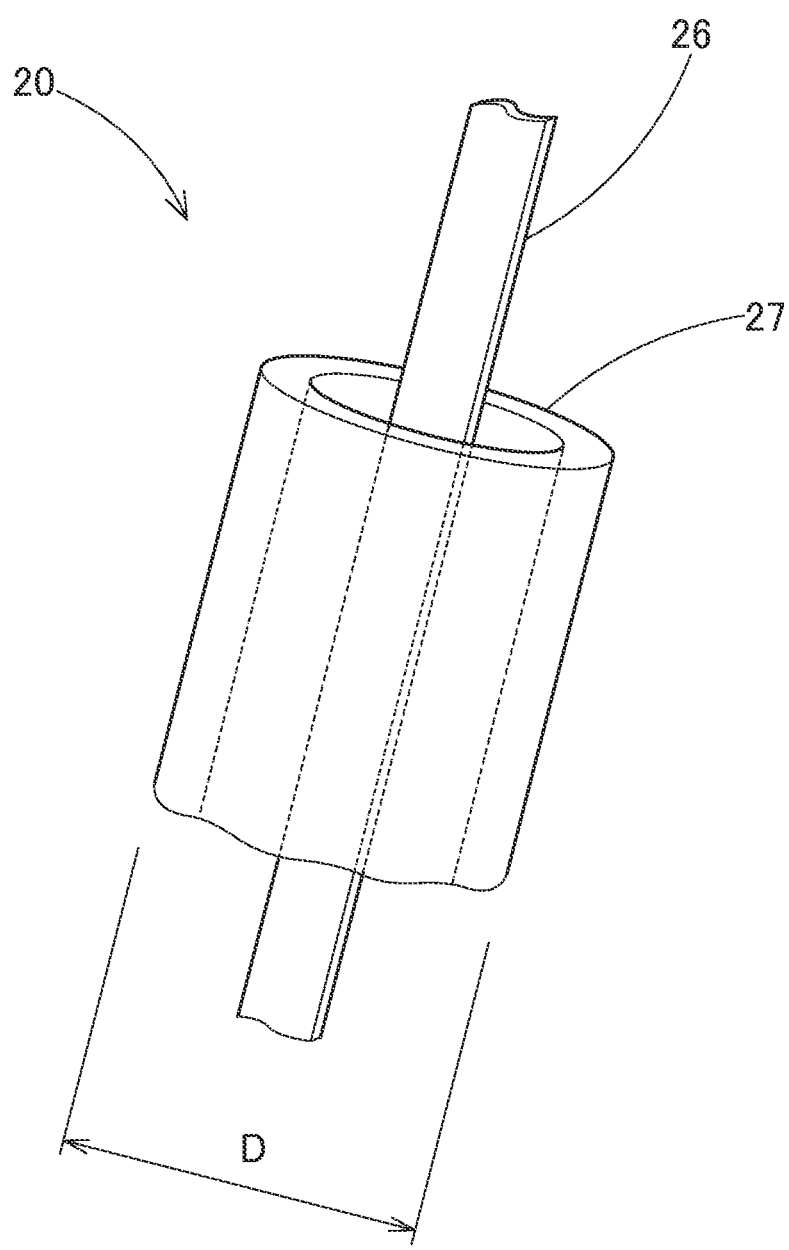
FIG. 5 is a partially broken sectional view of a shoulder restraining member in the occupant protection device.

Also, the shoulder restraining members 20(L) and 20(R) are configured of a strip-form core member 26, which is formed of cloth or the like that has flexibility and stretches little, and an approximately cylindrical tube member 27 that covers the core member 26 and is formed of a synthetic resin or the like that has good sliding properties, such as polypropylene, and has flexibility (refer to FIG. 5). The core member 26 is linked to a take-up roller 36 (L and R) of the take-up device 30. The tube member 27 is of such a length as to be housed in a vicinity of the upper portion 15a (L and R) of the housing portion 15, the side portion 15b (L and R), and an upper-side region of the front portion 15c (L and R), leaving a lower end side. This length dimension is set as a length such that when the shoulder restraining members 20(L) and 20(R) are taken up, there is as little interference as possible with the front face 14 side of the seat portion 10 on a peripheral edge of the aperture 17 (L and R). In other words, the length dimension is set in such a way that the tube member 27 comes into as little contact as possible with the front face 14 side of the seat portion 10, thereby avoiding buckling deformation. An external diameter dimension D of the tube member 27 is in the region of 20 to 50 mm (approximately 30 mm in the present embodiment).

The take-up device 30 is disposed on the front edge 11c side (a front portion 10a side inside the seat portion 10) of the seat portion 10, and is coupled to the lower end portion 20b of the shoulder restraining members 20(L) and 20(R). The take-up device 30 is configured in such a way as to be able to wind in such a way as to pull the lower end portion 20b of the shoulder restraining members 20(L) and 20(R), which are in a housed state, when the take-up device 30 operates.

The take-up device 30 includes a motor 31 that acts as a drive source, and a take-up mechanism 32 that takes up the shoulder restraining members 20(L) and 20(R) using a driving force of the motor 31. A drive of the motor 31 is controlled by a control device 60, and the motor 31 causes a drive shaft 31a to rotate by driving. A signal from an unshown collision predicting sensor, such as a millimeter-wave radar, that senses that a collision is to occur before an actual collision of a vehicle is input into the control device 60. The control device 60 drives the motor 31 in such a way as to rotate when a collision of the vehicle is predicted by the collision predicting sensor.

The take-up mechanism 32 is supported in such a way as to be able to rotate by a bearing 37 (L and R) inside the front portion 10a of the seat portion 10. The take-up mechanism 32 includes a rotary shaft 35 disposed in such a way that a rotational axis line direction thereof follows a left-right direction, a worm gear 33 attached to the drive shaft 31a of the motor 31, a worm wheel 34 that is attached to the rotary shaft 35 and meshes with the worm gear 33, and the two left and right take-up rollers 36 (L and R) fixed to the rotary shaft 35. The left and right take-up rollers 36 (L and R) are disposed on a side to a rear of and below the aperture 17 (L and R) on the front face 14 side of the seat portion 10, and wind around and hold the core member 26 of the lower end portion 20b of the shoulder restraining members 20(L) and 20(R) respectively. The take-up roller 36 (L and R) takes up the shoulder restraining members 20(L) and 20(R) owing to the worm wheel 34 meshing with the worm gear 33 rotating in accompaniment to a rotation of the drive shaft 31a of the motor 31, and the rotary shaft 35 rotating.

The motor 31 and the bearing 37 (L and R) are held in an unshown bracket that extends from a frame disposed inside the seat portion 10. The control device 60 is provided on a vehicle body side in front of the seat 1.

The shoulder restraining members 20(L) and 20(R) become detached and are fed out from the housing portion 15 owing to the lower end portion 20b being taken up by the take-up device 30, and are disposed from the upper body MU to both left and right sides of a thigh portion MF (L and R) of the occupant MP. Specifically, the shoulder restraining members 20(L) and 20 (R) are disposed in such a way that the bent portion 22 (L and R) bent on the left and right edge 4a and 4b sides of the upper end face 4 of the backrest portion 2 projects to left and right from an upper end portion 20a side in a state before being taken up. Further, the bent portion 22 is pulled forward by a downward tensile force by which the lower end portion 20b is taken up, and is pulled further downward in such a way that the length thereof decreases, and while a portion 20ca above the intermediate portion 20c is disposed on a front face side of left and right shoulder portions MS (L and R) of the occupant MP, portions in a vicinity of a center and a vicinity below the intermediate portion 20c are disposed in a state extended linearly on both left and right sides of the upper body MU and the thigh portion MF.

The lifting device 40 is disposed in the front portion 10a, which is on the front edge 11c side of the seat portion 10, and regulates (restricts) a forward movement of a buttock portion MH and the left and right thigh portions MF (L and R) of the occupant MP by causing the front edge 11c side of the seat face 11 to rise. When operating, the lifting device 40 pushes a push-up member 47 up from a lower standby position P0 to an upper raised position P1. The push-up member 47 causes a plate-form upper end portion 48 of an upper end to rise in the region of 10 to 30 mm (in the region of 20 mm in the present embodiment) as a height dimension H, causing the front edge 11c side of the seat face 11 to rise. Also, timings at which the lifting device 40 and the take-up device 30 operate are the same. In other words, the lifting device 40 operates when the take-up device 30 operates.

The lifting device 40 includes the motor 31 as a drive source, the push-up member 47, and a lifting mechanism 42. In the present embodiment, the motor 31 of the lifting device 40 and the motor 31 of the take-up device 30 are shared. Also, the worm gear 33, the worm wheel 34, and the rotary shaft 35 of the take-up device 30 are also shared with the lifting device 40. That is, the lifting mechanism 42 includes the worm gear 33 that meshes with the drive shaft 31a of the motor 31, the worm wheel 34 that meshes with the worm gear 33, and the rotary shaft 35 to which the worm wheel 34 is attached, and which is supported by the bearing 37 (L and R). Also, the lifting mechanism 42 includes two pinions 43 attached to the rotary shaft 35, a pinion 44 that meshes with the pinion 43, and a rack gear 45 that is provided on the push-up member 47 and meshes with the pinion 44.

The push-up member 47 is formed of a synthetic resin, such as polypropylene, having rigidity, or of a light metal, and is a portal member when seen from the front. The push-up member 47 includes the upper end portion 48, which extends in an approximate plate form in left and right directions, and a leg portion 49 (L and R), which supports the upper end portion 48 on both left and right end sides on a rear edge side. The rack gear 45 that meshes with the pinion 44 is provided on a front face 49a side of the leg portion 49 (L and R). Also, upward and downward movement of the push-up member 47 is guided by a guide 50 provided on a periphery of the leg portion 49 (L and R).

The lifting device 40 operates owing to a rotary drive by the motor 31. That is, on the drive shaft 31a of the motor 31 rotating, the worm wheel 34 meshing with the worm gear 33 rotates, and the rotary shaft 35 rotates. Because of this, the pinion 43 provided on the rotary shaft 35 and the pinion 44 meshing with the pinion 43 rotate, and the rack gear 45 meshing with the pinion 44 rises. Because of this, the push-up member 47 rises while being guided by the guide 50, pushes the upper end portion 48 of the push-up member 47 up from the standby position P0 to the raised position P1, and forms a raised region 11d by causing the front edge 11c of the seat face 11 on which the occupant MP is seated to rise.

A gear ratio of the pinions 43 and 44 is set to be a ratio such that when the take-up device 30 causes the take-up roller 36 (L and R) to rotate in such a way as to complete a taking up of the shoulder restraining members 20(L) and 20(R), the push-up member 47 is pushed up to a position wherein a pushing up from the standby position P0 to the raised position P1 is completed. In other words, the gear ratio is set to be a ratio such that a completion of a taking up and a completion of a pushing up are carried out simultaneously. A configuration wherein a pushing up is completed before a taking up is completed by a clutch mechanism in which a reverse rotation preventing mechanism is provided being provided on a pinion 44 side, and the gear ratio being changed, may be adopted.

The occupant protection device 70 is such that when a collision of the vehicle is predicted in a state wherein the occupant MP is seated in the seat 1, the control device 60 causes the motor 31 to operate. Because of this, the drive shaft 31a of the motor 31 rotates, whereby the take-up mechanism 32 of the take-up device 30 is driven. That is, the worm gear 33 attached to the drive shaft 31a rotates, the worm wheel 34 meshing with the worm gear 33 rotates, the rotary shaft 35 to which the worm wheel 34 is attached rotates, and the take-up roller 36 (L and R) pivotally supported by the rotary shaft 35 rotates. Because of this, the lower end portion 20b of the shoulder restraining members 20(L) and 20(R) is wound around the take-up roller 36 (L and R), and is pulled into the aperture 17 (L and R).

In a housed state before being taken up, the left and right shoulder restraining members 20(L) and 20(R) are housed in such a way as to extend to the left and right edge 4a and 4b sides on the upper end portion 3 side of the backrest portion 2 from the upper end portion 20a side on the upper end portion 3 side of the backrest portion 2, pass through the left and right edges 5a and 5b of the backrest portion 2 and the left and right edges 11a and 11b of the seat portion 10, and extend to the front edge 11c side of the seat portion 10. Further, on a lower end portion 20b side being pulled, the bent portion 22 (L and R) that bends from the left and right edge 4a and 4b sides on the upper end face 4 side of the backrest portion 2 to the side face 6 and 7 sides attains a state of being pulled to the front side, and the shoulder restraining members 20(L) and 20(R) are disposed from an upper face side to the front face side of the left and right shoulder portions MS (L and R) of the occupant MP owing to an inertial force of the bent portion 22 (L and R), restraining the left and right shoulder portions MS (L and R) of the occupant MP from the front face side.

Also, simultaneously with the heretofore described operation of the take-up device 30, the pinion 43 of the lifting device 40 rotates owing to a drive by the motor 31, the pinion 44 meshing with the pinion 43 rotates, the rack gear 45 is raised, and the push-up portion 48 of the push-up member 47 is moved from the standby position P0 to the raised position P1. Because of this, the front edge 11c side of the seat portion 10 rises, and a forward movement of the thigh portion MF (L and R) and the buttock portion MH of the occupant MP is regulated (restricted) by the raised region 11d.

Also, the left and right shoulder restraining members 20(L) and 20(R) when taken up are disposed on both left and right sides of the seated occupant MP in such a way as to cross a space between the backrest portion 2 and the seat portion 10 obliquely when seen from a side (refer to FIG. 4), in a state extending approximately linearly from the front face side of the shoulder portion MS (L and R) on the upper end portion 20a (which is a fixed end) side, to the front edge 11c side of the seat portion 10 on the lower end portion 20b side. Because of this, movement to the left and right of the occupant MP can be regulated by the intermediate portion 20c between the upper end portion 20a and the lower end portion 20b.

In this way, according to the occupant protection device 70 of the present embodiment, forward movement of the left and right shoulder portion MS (L and R) of the seated occupant MP is regulated by the left and right shoulder restraining members 20(L) and 20(R). Also, forward movement of the buttock portion MH and the thigh portion MF (L and R) on a lower limb side is regulated by the lifting device 40. Also, movement to the left and right of the upper body MU, including a lower back portion MW, and a vicinity of the thigh portion MF (L and R) is regulated by the intermediate portion 20c of the left and right shoulder restraining members 20(L) and 20(R). Because of this, forward movement of the occupant MP in a direction away from the seat 1, and a movement deviating to left or right, is appropriately restricted by the occupant protection device 70, and the occupant MP is protected. Also, the occupant protection device 70 appropriately restricting forward movement of the seated occupant MP in a direction away from the seat 1, and a movement deviating to left or right, means that even when the seat 1 is oriented in various directions in a configuration wherein the seat 1 can be rotated in a left-right direction and the like of the vehicle, the occupant MP can be restrained and appropriately protected.

Also, the occupant protection device 70 is such that the motor 31 is shared as a drive source that causes the take-up device 30 to drive and a drive source that causes the lifting device 40 to drive. In addition, the worm gear 33, the worm wheel 34, and the rotary shaft 35, which are components of a drive mechanism that causes the take-up device 30 and the lifting device 40 to drive, are shared. Because of this, space conservation can be achieved by simplifying the configuration, and a reduction in manufacturing cost can be achieved by reducing the number of parts.

Also, the shoulder restraining member 20(L) is configured of the core member 26 that has a flexibility and is taken up by the take-up device 30, and the tube member 27 that has a flexibility and covers the core member 26. In the same way, the shoulder restraining member 20(R) is configured of the core member 26 that has a flexibility and is taken up by the take-up device 30, and the tube member 27 that has a flexibility and covers the core member 26. Further, when the shoulder restraining members 20(L) and 20(R) are taken up by the take-up device 30, the core member 26 is taken up. Because of this, the tube member 27, which has good sliding properties, comes into contact with the occupant MP, the seat portion 10 of the seat 1, and the backrest portion 2, and sliding of the core member 26, which passes through an interior of the tube member 27, is restricted, because of which the take-up device 30 can take up the shoulder restraining members 20(L) and 20(R) smoothly.

In the present embodiment, a configuration wherein the shared motor 31 is used as a drive source of the lifting device 40 and the take-up device 30 has been described, but the invention is not limited to this. That is, a lifting device 40A wherein a spring member 51 is used, as in an occupant protection device 70A shown in FIGS. 8 to 10, may be used as a drive source that causes the push-up member 47 to rise.

The occupant protection device 70A according to this modification differs from the configuration of the heretofore described embodiment only in that the spring member 51 is used as a drive source of a push-up member 52 of the lifting device 40A that causes the front edge 11c side of the seat portion 10 to rise.

Figure 8:
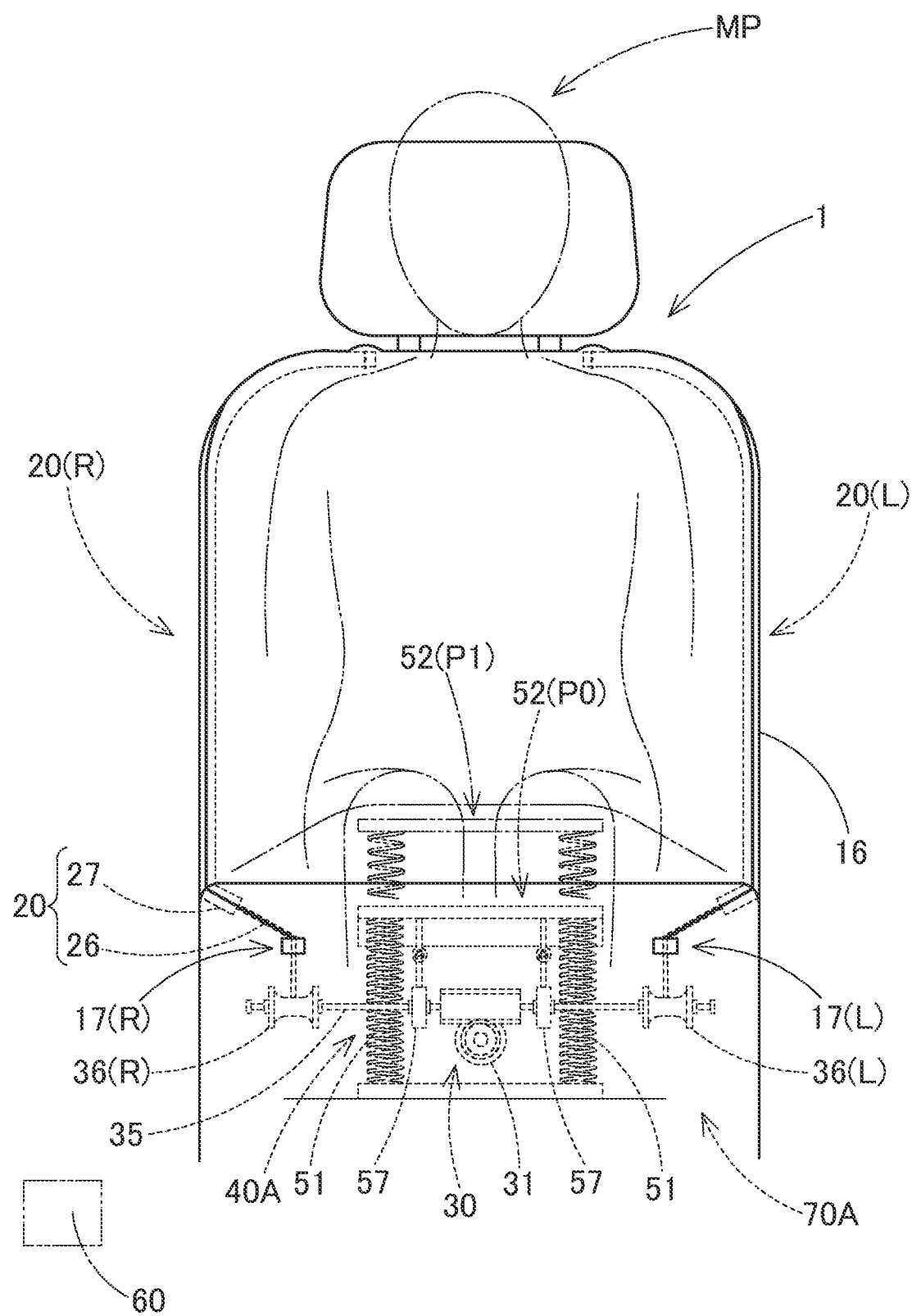
FIG. 8 is a schematic front view illustrating a lifting device according to a modification.
Figure 9:
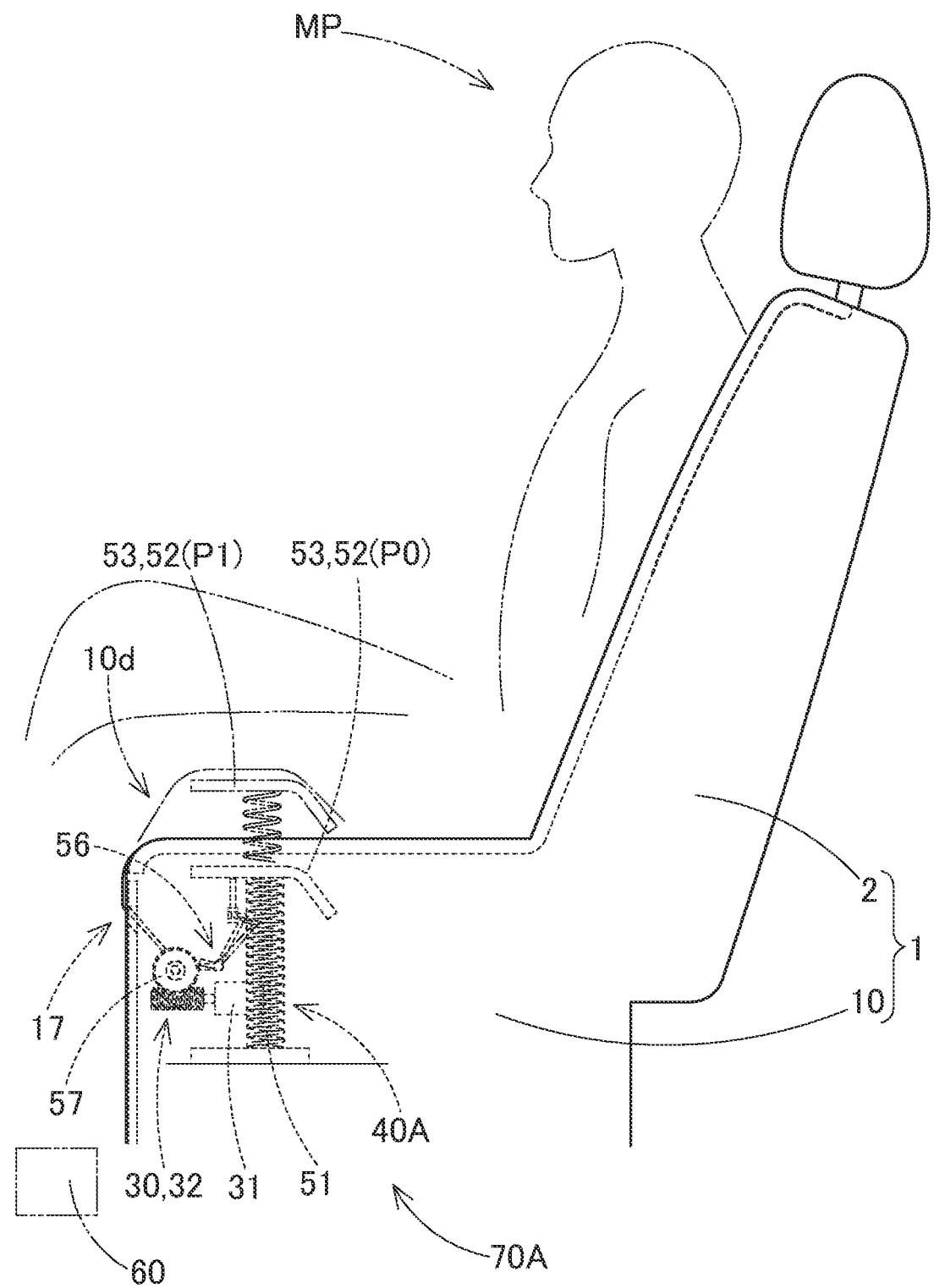
FIG. 9 is a schematic side view illustrating the lifting device according to the modification.
Figure 10A:
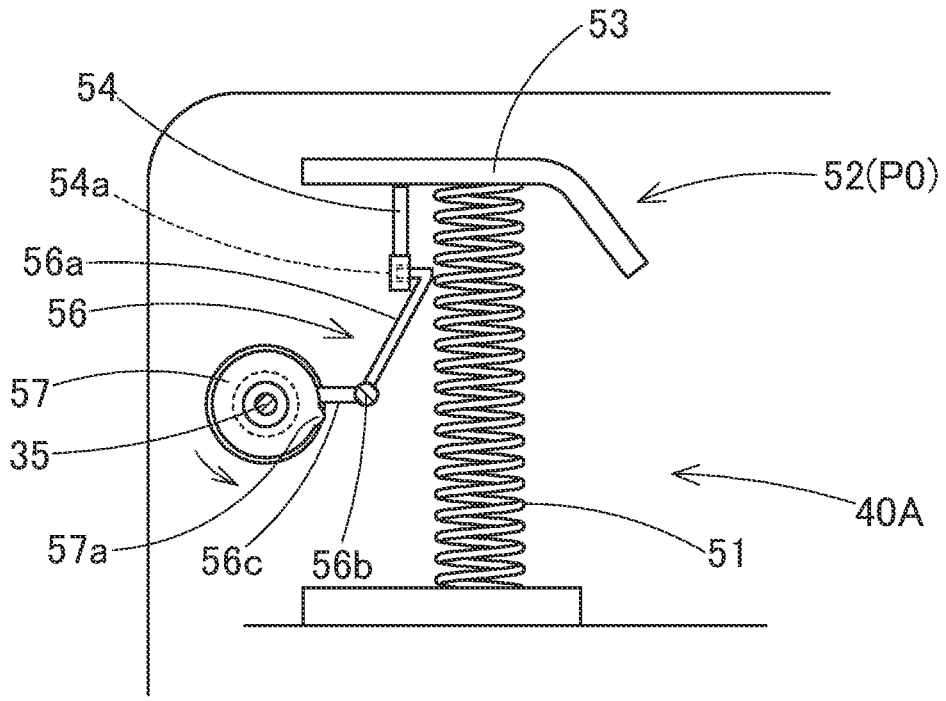
FIGS. 10A and 10B are schematic illustrations illustrating operations when the lifting device according to the modification operates.
Figure 10B:
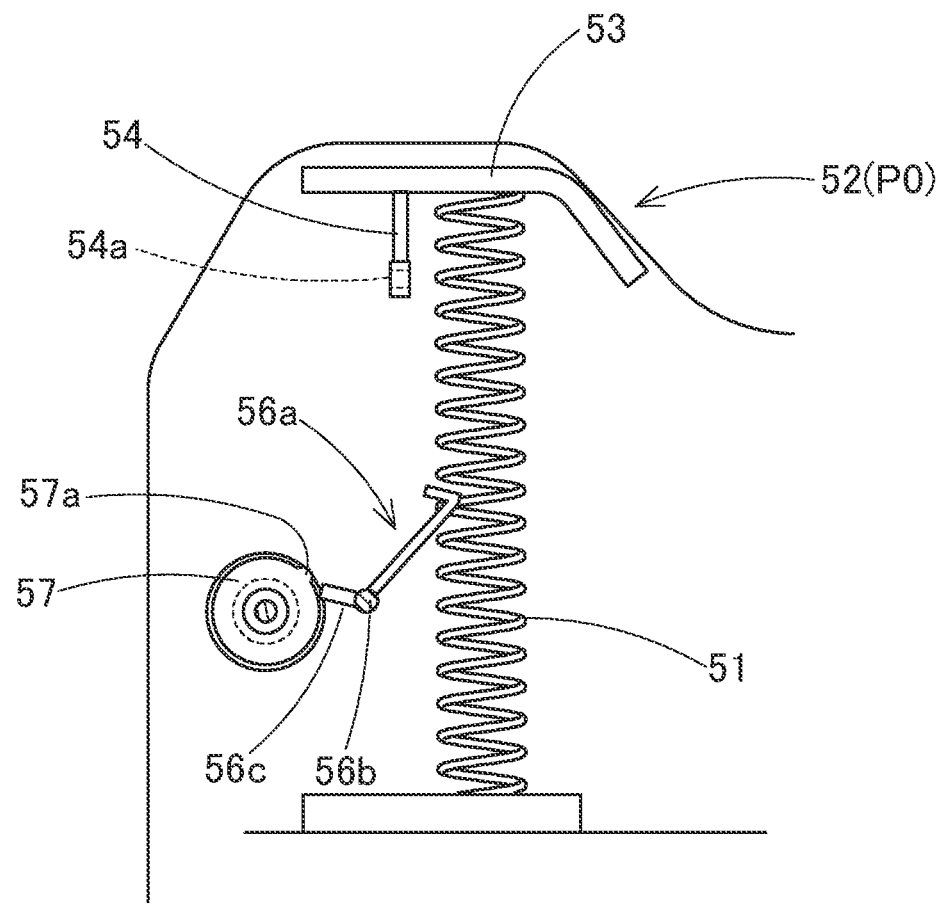

As shown in FIGS. 8 and 9, the spring member 51, which is formed of a helical compression spring, is in contact with a lower face on both left and right sides of the push-up member 52. As shown in FIGS. 10A and 10B, the push-up member 52 includes an approximately plate-form push-up portion 53, with which the spring member 51 comes into contact and which receives a biasing force from the spring member 51, and an engagement portion 54 that protrudes downward from a lower face of the push-up portion 53. A hook 56a of an engagement release lever 56 is engaged with an engagement ring 54a of the engagement portion 54. The engagement release lever 56 is disposed in such a way as to be pivotable in forward and backward directions using a shaft support portion 56b, and includes a contact piece 56c that extends forward from the shaft support portion 56b. A projecting portion 57a of a cam 57 attached to the rotary shaft 35 comes into contact with the contact piece 56c. On the hook 56a of the engagement release lever 56 becoming detached from the engagement ring 54a, thereby releasing an engagement of the engagement portion 54, the push-up member 52 rises from the standby position P0 to the raised position P1 owing to the biasing force of the spring member 51.

That is, the lifting device 40A receives an operation signal from the control device 60, the motor 31 carries out a rotary drive, the worm gear 33 rotates, the worm wheel 34 meshing with the worm gear 33 rotates, and the rotary shaft 35 rotates, whereby the cam 57 rotates. On the cam 57 rotating, the projecting portion 57a comes into contact with the contact piece 56c, and the hook 56a of the engagement release lever 56 is rotated backward. Because of this, the hook 56a of the engagement release lever 56 releases the engagement of the engagement ring 54a of the push-up member 52, the push-up member 52 is raised from the standby position P0 to the raised position P1 by the biasing force of the spring member 51, and the front edge 11c side of the seat portion 10 is caused to rise, forming the raised region 11d. Also, as in the heretofore described embodiment, the shoulder restraining members 20(L) and 20(R) are taken up by the take-up roller 36 (L and R) when the lifting device 40A forms the raised portion 11d. Consequently, according to the occupant protection device 70A according to the modification, the same effects and advantages as in the case of the occupant protection device 70 of the heretofore described embodiment can be obtained.

What is claimed is:

1. An occupant protection device, comprising:
   a seat having a seat portion and a backrest portion;
   a first restraining member configured to restrain a left shoulder of an occupant seated on the seat, an upper end portion of the first restraining member being fixed to a left upper end side of the backrest portion, an intermediate portion between the upper end portion and a lower end portion of the first restraining member being housed in a left side face of the backrest portion and a left side face of the seat portion;

a second restraining member configured to restrain a right shoulder of the occupant seated on the seat, an upper end portion of the second restraining member being fixed to a right upper end side of the backrest portion, an intermediate portion between the upper end portion and a lower end portion of the second restraining member being housed in a right side face of the backrest portion and a right side face of the seat portion;

a take-up unit that holds and takes up each of the lower end portion of the first restraining member and the lower end portion of the second restraining member, the take-up unit being disposed on a front edge side of the seat portion; and a lifting unit that causes a front edge side of a seat face of the seat portion to rise, wherein the first restraining member is fed out from a housing portion of the seat owing to being taken up by the take-up unit, and restrains the left shoulder of the occupant from the front of the left shoulder, and the second restraining member is fed out from a housing portion of the seat owing to being taken up by the take-up unit, and restrains the right shoulder of the occupant from the front of the right shoulder, and wherein the lifting unit causes the front edge side of the seat face of the seat portion to rise when the take-up unit takes up the first restraining member and the second restraining member.

2. The occupant protection device according to claim 1, wherein a drive source that causes the take-up unit to drive and a drive source that causes the lifting unit to drive are shared.

3. The occupant protection device according to claim 1, wherein the first restraining member includes a core member that has a flexibility and is taken up by the take-up unit, and a tube member that has a flexibility and covers the core member of the first restraining member, and wherein the second restraining member includes a core member that has a flexibility and is taken up by the take-up unit, and a tube member that has a flexibility and covers the core member of second restraining member.

* * * * *